L. C. MARBURG.
ALTERNATING CURRENT SYSTEM.
APPLICATION FILED JAN. 7, 1910.
1,144,149.
Patented June 22, 1915.
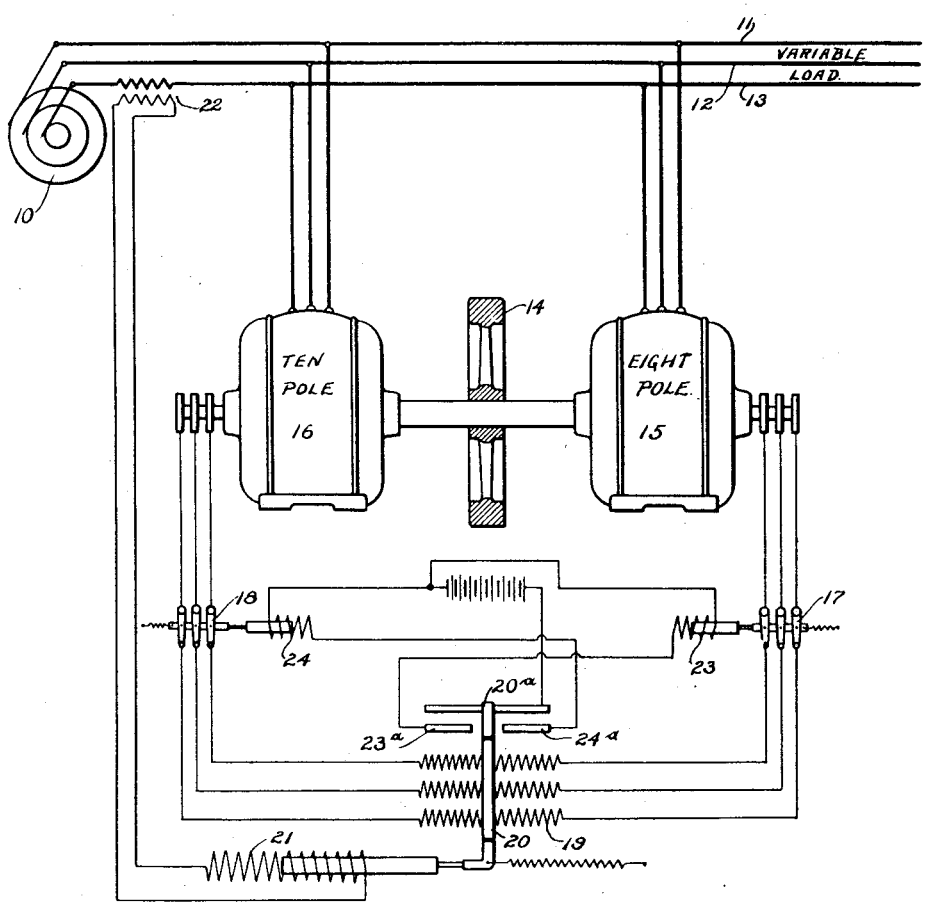

UNITED STATES PATENT OFFICE.

LOUIS C. MARBURG, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

ALTERNATING-CURRENT SYSTEM.

1,144,149.  Specification of Letters Patent.  Patented June 22, 1915.

Application filed January 7, 1910. Serial No. 536,880.

*To all whom it may concern:*

Be it known that I, LOUIS C. MARBURG, a citizen of the United States, residing at Milwaukee, in the county of Milwaukee and State of Wisconsin, have invented certain new and useful Improvements in Alternating-Current Systems of which the following is a full, clear, and exact specification.

My invention relates to systems of electrical distribution.

In many electrical systems the load fluctuates very rapidly between wide limits, the upper limit often greatly exceeding the capacity of the generator supplying the system. In systems of this sort it has been proposed to connect across the line a dynamo-electric power device whose rotating member has large inertia, which power device acts as motor to store up kinetic energy when the load on the line is light and as generator driven by such stored energy when the load on the line is heavy.

It is the object of my present invention to obtain in a system of this sort, especially where the system is an alternating current one, an arrangement by which the storing and giving up of the kinetic energy may be more readily and accurately controlled.

The present invention, which is a modification of that set forth and broadly claimed in my co-pending application Serial No. 536,878, of even date herewith, consists, like that set forth in said co-pending application, in an arrangement whereby the relation between the synchronous speed of the dynamo-electric power device and the speed at which the power device is actually rotating under the influence of the rotating mass in which kinetic energy is stored is varied, preferably under the control of the load on the circuit. In the arrangement set forth in this present application, as well as in those set forth in said co-pending application, there is a dynamo-electric power device having a rotating member of large inertia, and this dynamo-electric power device has two windings arranged, when respectively rendered effective, to give the power device two different maximum motor speeds. The speed at which the power device normally runs is between these two speeds, and one or the other of the two windings is rendered effective according as the load on the circuit is light or heavy. When the load is light, the winding which gives the higher maximum motor speed is effective and the power device acts as a motor to store up kinetic energy in its massive rotating member. When the load is heavy, the winding which gives the lower maximum motor speed is effective and the stored energy is given up to drive the power device as a generator to cause it to supply energy to the circuit. In the specific modifications described in said co-pending application, these two windings are rendered effective and ineffective by connecting and dis-connecting them from the circuit carrying the variable load. In the present application the same result is obtained without changing the connections of these two windings, but by varying between zero and maximum values the currents in other windings inductively associated with the first mentioned windings. Preferably the whole operation is automatic.

The various novel features of my invention will be apparent from the description and drawings, and will be particularly pointed out in the claims.

The single figure of the drawing shows diagrammatically one embodiment of my invention.

The generator 10 supplies the distribution circuit 11—12—13, on which there is a load which fluctuates quite rapidly within wide limits. This load may be of any character, but the invention is especially applicable to those cases where the variable load is a power load, consisting, for instance, of one or more rolling-mill motors. The generator 10 is here shown as a three-phase generator, but my invention in its broader aspect is not limited to alternating current systems. Across the circuit 11—12—13 is connected a dynamo-electric power device the rotating member of which has large inertia, as by being connected to the fly-wheel 14. This dynamo-electric power device is arranged to act as a motor to store up energy in the fly-wheel when the load on the circuit 11—12—13 is light, and as a generator driven by the energy stored in the fly-wheel to supply current to the circuit 11—12—13 when the load on such circuit is heavy. The arrangement for controlling the consumption and production of energy of the dynamo-electric power device and fly-wheel is the essence of my present invention.

The dynamo-electric power device illustrated consists of two separate induction motors 15 and 16 having different numbers of poles, say eight and ten respectively. These two motors are mechanically connected together and to the fly-wheel 14, preferably by being mounted on the same shaft with the fly-wheel. These motors, as shown, are of the wound rotor type, and have their primary windings permanently connected across the circuit 11—12—13. The secondary windings of these motors are connected, through normally closed switches 17 and 18 respectively, to opposite ends of a three-phase resistance 19, which is divided into two parts, one for each motor, by a short-circuiting bar 20. The position of the short-circuiting bar 20 is automatically adjustable by means of the solenoid 21, responsive, as through a current transformer 22, to the current supplied to the circuit 11—12—13 by the generator 10. The solenoid is preferably so designed that its core has comparatively large movements upon small changes in the supplied current. The switches 17 and 18 are opened, by solenoids 23 and 24 respectively, when the short-circuiting bar 20 has been moved to cut a predetermined amount of the resistance 19 into the secondary circuits of the motors 15 and 16 respectively, the two solenoids 23 and 24 being controlled by an insulated extension 20ᵃ on the short-circuiting bar 20.

The dynamo-electric power device may be started in any desired manner. When the load on the circuit 11—12—13 is small, and the current supplied by the generator 10 does not exceed a predetermined value, the short-circuiting bar 20 is at its right-hand limit of movement and the eight-pole motor 15 operates with practically no resistance in its secondary circuit. The solenoid 24 is energized at this time and holds the switch 18 open, thus breaking the secondary circuit of the ten-pole motor 16 and thereby rendering its primary winding ineffective. The eight-pole motor 15 operates as a motor to store up kinetic energy in the fly-wheel 14, the speed of the motor 15 approaching synchronism as a limit.

As the load on the circuit 11—12—13 rises and the current supplied to said circuit by the generator 10 increases, the solenoid 21 moves the bar 20 to the left to insert the resistance 19 gradually in the secondary circuit of the motor 15, thus causing said motor, because of its increased slip, to take less current from the line. As this movement of the bar 20 to the left continues because of the rising current supplied to the line by the generator 10, the extension 20ᵃ leaves the contact 24ᵃ, thus causing the deenergization of the solenoid 24 to allow the closing of the switch 18. The secondary circuits of both motors are now energized and the eight-pole motor 15 acts as motor, assisted by the fly-wheel 14, to drive the ten-pole motor 16 as an induction generator to supply current to the line. There is thus a circulation of energy from the line through the motor 15, the common shaft of the motors 15 and 16, and the motor 16 to the line again. This condition preferably does not continue for a great while, as upon the continuance of the movement of the bar 20 to the left the extension 20ᵃ engages the contact 23ᵃ to cause the energization of the solenoid 23 and the opening of the switch 17. This renders the primary winding of the eight-pole motor 15 ineffective, the ten-pole motor 16 now being driven above synchronism by the energy stored in the fly-wheel 14 and supplying current to the circuit 11—12—13 at the frequency set by the generator 10. If the current supplied by the generator 10 still increases, the bar 20 is moved still farther to the left, thus cutting more of the resistance 19 out of the secondary circuit of the induction generator 16 and thereby causing the latter to supply more power to the line.

When the load on the circuit 11—12—13 falls, and the current supplied by the generator 10 to said circuit decreases, the solenoid 21 becomes weaker and allows the short-circuiting bar 20 to be moved to the right by its spring, thus first increasing the secondary resistance of the induction generator 16 and thereby diminishing the rate at which said induction generator supplies energy to the line, then causing the deënergization of the solenoid 23 and the closing of the switch 17 so that the continued movement of the bar 20 to the right both increases the resistance in the secondary circuit of the induction generator 16 and decreases the resistance in the secondary circuit of the induction motor 15, and then causing the energization of the solenoid 24 and the opening of the switch 18 so that the further continuance of the movement of the short-circuiting bar 20 to the right merely diminishes the resistance in the secondary circuit of the induction motor 15. The length of the contacts 23ᵃ and 24ᵃ may be made anything desired, so that the period during which the secondary resistances of the two motors are both varied may be long or short as compared with the periods during which only one of such secondary resistances is varied. During all of this movement of the bar 20 to the right the energy supplied to the line by the dynamo-electric power device 15 and 16 in combination with the fly-wheel 14 is diminished, passing from a positive value to a negative value. The cycle above described is repeated, with more or less completeness, as demanded by the fluctuations in the load on the circuit 11—12—13.

One specific embodiment of my invention has been described, but the invention is not limited to it. The large inertia needed may of course be inherent in the rotor of the dynamo-electric power device, or may be obtained by having a separate fly-wheel mechanically connected to such rotor, as by being mounted on the same shaft therewith; both forms are included when such expressions as "a dynamo-electric power device having a rotating member of large inertia" are used. Indeed, in some of its aspects the invention is applicable to other than alternating current systems. When two exciting windings are used in the dynamo-electric power device, it is only necessary that they produce different maximum motor speeds; that is, that the speeds at which the counter electromotive force becomes equal to the impressed electromotive force shall be different.

In the following claims I aim to cover all those modifications which do not depart from the spirit and scope of my invention.

What I claim as new is:

1. In combination, a generator, an electric circuit supplied thereby and carrying a variable load, a dynamo-electric power device connected across said circuit and having a rotating member which has large inertia, said dynamo-electric power device being provided with two windings which determine different maximum motor speeds, said windings being permanently connected to said circuit during the operation of said power device and means responsive to the current supplied by said generator to said circuit for rendering effective the winding which determines the higher maximum motor speed when the current supplied by the generator is below a predetermined value, and for rendering the other winding effective when the current supplied by said generator is above a predetermined value.

2. In combination, a generator, an electric circuit supplied thereby, a dynamo-electric power device connected across said circuit and provided with two windings which determine different maximum motor speeds, the rotating member of said power device having large inertia, and means responsive to electrical conditions in said circuit for rendering either of said windings effective or ineffective while at all times maintaining both of said windings connected to the circuit during the operation of said power device.

3. In combination, a generator, a circuit supplied thereby, a dynamo-electric power device connected across said circuit and comprising two motors having different maximum motor speeds, a fly-wheel connected to said dynamo-electric power device, and means responsive to electrical conditions in said circuit for rendering either of said motors effective or ineffective while at all times maintaining both motors connected to the circuit during the operation of said power device.

4. In combination, an alternating current generator, an alternating current circuit supplied thereby and carrying a variable load, a dynamo-electric power device connected across said circuit and having a rotating member of large inertia and flux-producing means capable of determining different numbers of poles and permanently connected to said circuit during the operation of said power device, and means responsive to the current supplied by said generator to said circuit for varying the effective number of poles of said dynamo-electric power device in the same sense as the current supplied by said generator varies.

5. In combination, an alternating current generator, an alternating current circuit supplied thereby and carrying a variable load, a dynamo-electric power device of the induction motor type connected across said circuit during the operation of said power device, and means responsive to the current supplied by said generator for varying the effective number of poles of said dynamo-electric power device and for varying the secondary resistance of said power device.

6. In combination, an alternating current generator, an alternating current circuit supplied thereby and carrying a variable load, a dynamo-electric power device of the induction motor type having a plurality of primary windings capable of determining different numbers of poles, the rotating member of said power device having large inertia and all of said primary windings being permanently connected to said circuit during the operation of said power device, and means responsive to electrical conditions in said circuit for rendering any of said windings effective or ineffective.

7. In combination, an alternating current generator, an alternating current circuit supplied thereby and carrying a variable load, two induction motors the primary windings of which are connected across said circuit during the operation of either of said motors, said two motors having different numbers of poles, a fly-wheel, said fly-wheel and said two motors being all mechanically connected, and automatic means responsive to the current supplied by said generator for opening and closing the secondary circuits of said motors.

8. In combination, an alternating current generator, an alternating current circuit supplied thereby and carrying a variable load, two induction motors the primary windings of which are permanently connected across said circuit during the operation of either of said motors, said two motors having different numbers of poles, a fly-wheel, said fly-wheel and said two motors being all mechanically connected, and automatic means responsive to the current supplied by said generator for varying the resistance of the secondary circuits of said two motors.

9. In combination, an alternating current generator, an alternating current circuit supplied thereby and carrying a variable load, two induction motors the primary windings of which are permanently connected across said circuit, said two motors having different numbers of poles, a fly-wheel, said fly-wheel and said two motors being all mechanically connected, resistance for the secondary circuits of said motors, and automatic means controlled by the current supplied by said generator for opening the secondary circuit of the motor having the higher number of poles when such current is below a predetermined value and for opening the secondary circuit of the other motor when such current is above a predetermined value and for varying the resistance in the secondary circuits of said two motors.

10. In combination, an alternating current generator, an alternating current circuit supplied thereby and carrying a variable load, two induction motors the primary windings of which are permanently connected across said circuit, a fly-wheel to which both of said motors are mechanically connected, the two motors tending when operating at their respective synchronous speeds to drive said fly-wheel at different speeds, and automatic means controlled by the current supplied by said generator for controlling the secondary circuits of said two motors.

11. In combination, an alternating current generator, an alternating current circuit supplied thereby, two induction motors the primary windings of which are connected across said circuit, said two motors having different numbers of poles, a fly-wheel, said fly-wheel and said two motors being mechanically connected, a variable resistance connected in common in the secondary circuit of each of said motors, and means responsive to the current in the supply circuit for increasing the resistance of the secondary circuit of one motor and decreasing the resistance of the secondary circuit of the other motor as the load increases.

12. In combination, a generator, an electric circuit supplied thereby, a dynamo-electric power device connected across said circuit and provided with two primary windings which determine different maximum motor speeds, the rotating member of said power device having great inertia, a secondary circuit corresponding to each primary winding, a resistance connected in the circuit of each secondary, and means responsive to the current in said supply circuit for consecutively increasing the resistance of the secondary winding corresponding to the primary winding which gives the higher speed, completing the circuit of the secondary winding corresponding to the primary winding which gives the lower speed, breaking the circuit of the first secondary winding, and decreasing the resistance of the second secondary circuit as the load on said supply circuit increases.

13. In combination, a generator, an electric circuit supplied thereby, a dynamo-electric power device connected across said circuit and provided with windings which determine different maximum motor speeds, the rotating member of said power device having great inertia, windings adapted to coöperate with said first windings in the operation of said dynamo-electric power device, a common variable resistance adapted to be included in the circuit of said second mentioned windings, and means responsive to the electrical conditions in said circuit for varying said resistance as the load on said circuit varies.

Milwaukee, Wis., Dec. 22, 1909.

In testimony whereof I affix my signature, in the presence of two witnesses.

LOUIS C. MARBURG.

Witnesses:
ALEX J. NICHT, Jr.,
CHAS. L. BYRON.